United States Patent
Kaiser et al.

(10) Patent No.: US 7,305,467 B2
(45) Date of Patent: *Dec. 4, 2007

(54) AUTONOMOUS TRACKING WIRELESS IMAGING SENSOR NETWORK INCLUDING AN ARTICULATING SENSOR AND AUTOMATICALLY ORGANIZING NETWORK NODES

(75) Inventors: William J. Kaiser, Los Angeles, CA (US); Lars Fredric Newberg, Marina Del Rey, CA (US); Gregory J. Pottie, Los Angeles, CA (US)

(73) Assignee: Borgia/Cummins, LLC, Wilmington, DE (US)

( * ) Notice: Subject to any disclaimer, the term of this patent is extended or adjusted under 35 U.S.C. 154(b) by 871 days.

This patent is subject to a terminal disclaimer.

(21) Appl. No.: 10/329,069

(22) Filed: Dec. 23, 2002

(65) Prior Publication Data

US 2003/0154262 A1 Aug. 14, 2003

Related U.S. Application Data

(60) Provisional application No. 60/366,877, filed on Mar. 22, 2002, provisional application No. 60/345,198, filed on Jan. 2, 2002.

(51) Int. Cl.
*G06F 15/173* (2006.01)
*G06F 15/16* (2006.01)
*G01V 3/00* (2006.01)

(52) U.S. Cl. ............... 709/224; 709/201; 340/995.28; 340/855.6

(58) Field of Classification Search ........ 709/200–203, 709/217–227, 229, 231–234, 238, 242, 243, 709/244, 246, 249, 250; 718/100; 719/310, 719/311, 318, 315, 316, 317; 340/539, 995.28, 340/855.6; 706/33

See application file for complete search history.

(56) References Cited

U.S. PATENT DOCUMENTS

| | | | | |
|---|---|---|---|---|
| 5,889,477 | A * | 3/1999 | Fastenrath | 340/905 |
| 5,973,309 | A * | 10/1999 | Livingston | 250/203.1 |
| 6,140,957 | A * | 10/2000 | Wilson et al. | 342/357.08 |
| 6,252,544 | B1 * | 6/2001 | Hoffberg | 342/357.1 |
| 6,414,955 | B1 * | 7/2002 | Clare et al. | 370/390 |
| 6,545,601 | B1 * | 4/2003 | Monroe | 340/521 |
| 6,584,382 | B2 * | 6/2003 | Karem | 701/3 |
| 6,640,145 | B2 * | 10/2003 | Hoffberg et al. | 700/83 |

(Continued)

*Primary Examiner*—Haresh Patel
(74) *Attorney, Agent, or Firm*—Greenberg Traurig, LLP; Bruce T. Neel

(57) ABSTRACT

A wireless integrated network sensor (WINS) system is provided that integrates articulating tracking systems with WINS network components including visual or infrared sensors and imaging devices to enable precise tracking and targeting of objects moving through a sensor field or past a single integrated sensing and targeting unit. Further, arrays of sensors together with local signal processing are used to trigger cameras and tracking systems, and to provide an alternative location capability for improved robustness. The system is self-configuring and remotely controllable, and enables remote systems and operators to query for collected data, including sensory and image data, and control the system in response to the collected data.

19 Claims, 2 Drawing Sheets

U.S. PATENT DOCUMENTS

| | | |
|---|---|---|
| 6,662,091 B2 * | 12/2003 | Wilson et al. .................. 701/33 |
| 6,735,630 B1 * | 5/2004 | Gelvin et al. ................ 709/224 |
| 6,801,662 B1 * | 10/2004 | Owechko et al. ............ 382/224 |
| 6,813,542 B2 * | 11/2004 | Peshkin et al. .............. 700/245 |
| 6,826,607 B1 * | 11/2004 | Gelvin et al. ................ 709/224 |
| 6,859,831 B1 * | 2/2005 | Gelvin et al. ................ 709/224 |
| 6,990,080 B2 * | 1/2006 | Bahl et al. ................... 370/254 |
| 7,020,701 B1 * | 3/2006 | Gelvin et al. ................ 709/224 |
| 7,049,953 B2 * | 5/2006 | Monroe ....................... 340/521 |
| 7,069,188 B2 * | 6/2006 | Roberts ....................... 702/188 |
| 2002/0036750 A1 * | 3/2002 | Eberl et al. .................. 351/207 |
| 2002/0067475 A1 * | 6/2002 | Waibel et al. .............. 356/4.01 |
| 2002/0111213 A1 * | 8/2002 | McEntee et al. ............... 463/42 |
| 2004/0006424 A1 * | 1/2004 | Joyce et al. ................. 701/207 |
| 2004/0008651 A1 * | 1/2004 | Ahmed ........................ 370/338 |
| 2004/0049428 A1 * | 3/2004 | Soehnlen et al. .............. 705/25 |
| 2005/0267638 A1 * | 12/2005 | Peshkin et al. .............. 700/264 |
| 2006/0083217 A1 * | 4/2006 | Bae ............................ 370/351 |

* cited by examiner

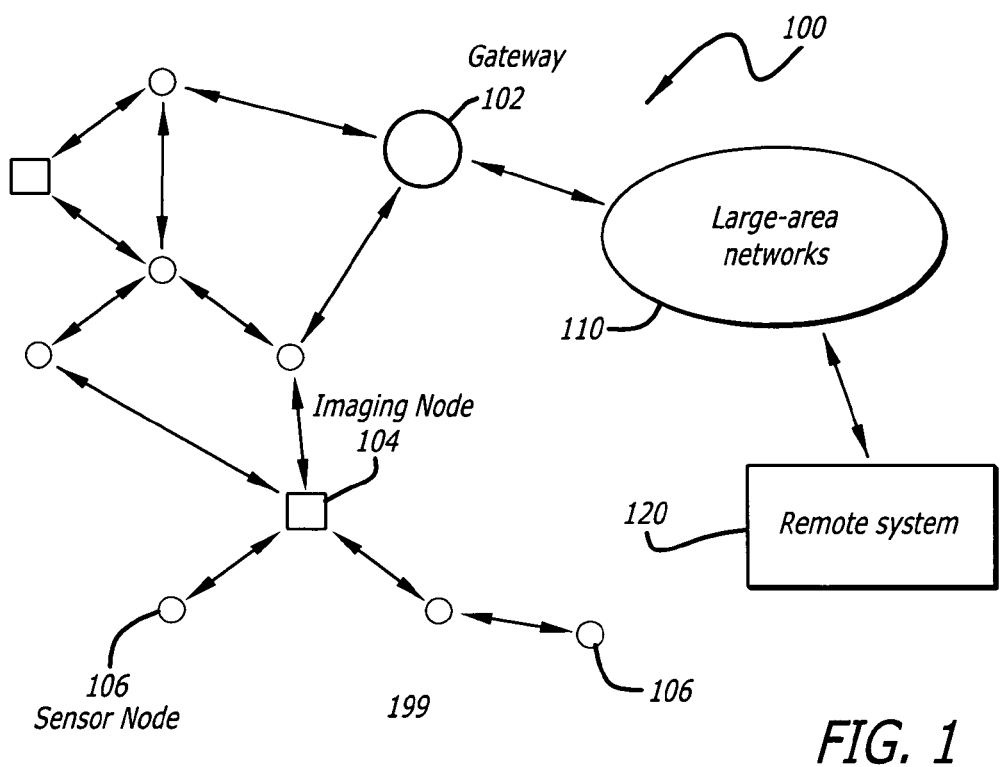
FIG. 1
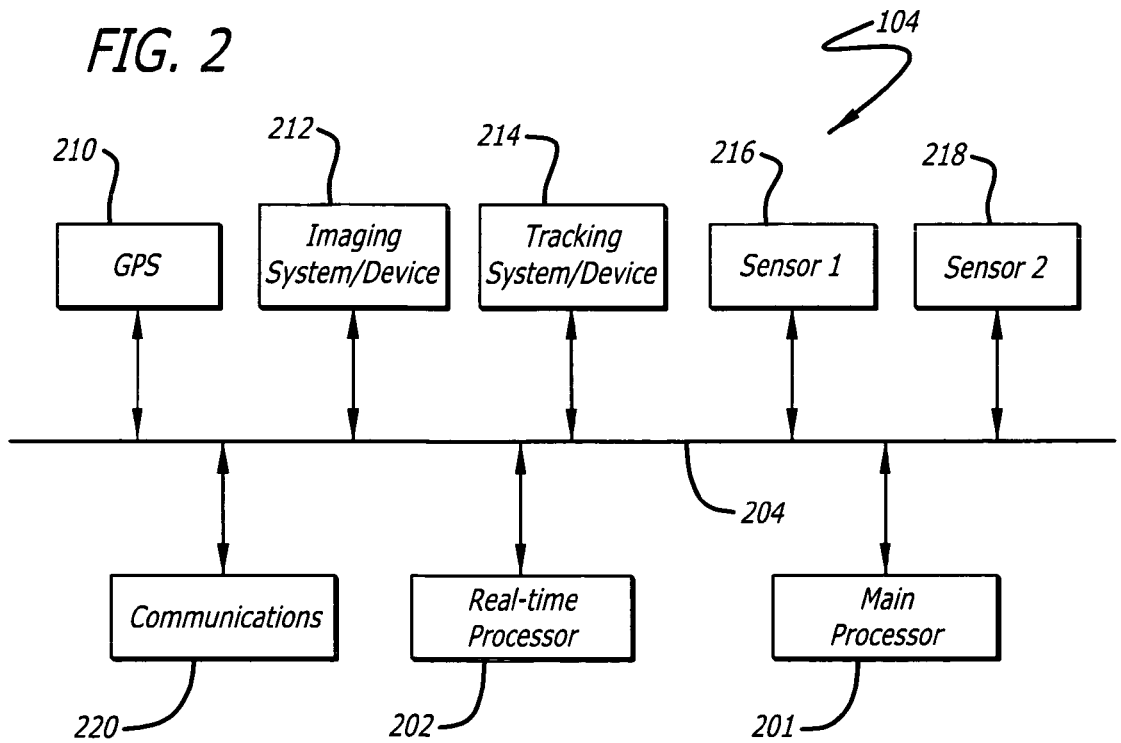

AUTONOMOUS TRACKING WIRELESS IMAGING SENSOR NETWORK INCLUDING AN ARTICULATING SENSOR AND AUTOMATICALLY ORGANIZING NETWORK NODES

RELATED APPLICATIONS

This application claims the benefit of U.S. Provisional Application No. 60/345,198, filed Jan. 2, 2002, and 60/366,877 filed Mar. 22, 2002.

This application is related to U.S. patent application Ser. Nos. 09/684,706, 09/684,565, now U.S. Pat. Nos. 7,020,751, Ser. No. 09/685,020, now U.S. Pat. No. 6,832,251, Ser. No. 09/685,019, now U.S. Pat. No. 6,826,607, application Ser. Nos. 09/684,387, 09/684,490, 09/684,742, 09/680,550, now U.S. Pat. No. 6,735,630, Ser. No. 09/685,018, U.S. Pat. No. 6,859,831,application Ser. Nos. 09/684,388, 09/684,162 now abandoned, and application Ser. No. 09/680,608, all filed Oct. 4, 2000, Ser. No. 10/184,527, U.S. Pat. No. 7,207,041, filed Jun. 28, 2002, Ser. No. 10/188,514, U.S. Pat. No. 7,161,926, filed Jul. 3, 2002.

TECHNICAL FIELD

The present invention relates to the sensing and tracking of moving objects using wireless integrated sensor networks.

BACKGROUND

The Related Applications referenced above describe a network of wireless sensor nodes, referred to as wireless integrated network sensors (WINS). These nodes include communications, signal processing, data storage, and sensing capabilities, and the ability to autonomously form networks and perform cooperative signal processing tasks. These processing tasks include, for example, cooperative acoustic or seismic beam forming to locate targets or other nodes. This information can then, for example, control a camera to train upon the indicated location, if associated identification algorithms indicate that the target is of an interesting class. Human operators can be involved in the identification if information is conveyed from the sensor network. For example, the images and sensor data may be displayed using standard browsing tools, and commands sent to re-prioritize the activities of the remote network.

The seismic and acoustic location techniques can be vulnerable to a variety of environmental factors, and thus can have limited accuracy in some deployment circumstances. For example, non-homogeneity of the terrain results in multipath propagation and variable propagation speeds, while wind and certain thermal conditions can affect the usefulness of acoustic ranging systems. Such systems can also have difficulty separating targets that are in close proximity. These deficiencies can, to some extent, be ameliorated using a sufficiently dense network of sensors, but the signal processing tasks can then become very complicated. Moreover, it may demand energy-intensive communication of large quantities of data for coherent processing.

By contrast, if a line of sight exists between a node and a target, laser tracking systems like those described in U.S. Pat. No. 4,063,819, for example, are highly selective among targets and insensitive to most environmental conditions on the ground except extreme fog. Numerous commercial realizations of the laser tracking systems exist in compact form factors, such as for example the AN/PAQ-1 compact laser designator. On the other hand, constant scanning by active lasers is power intensive because of the laser and the associated servo mechanisms, and the requirements for large amounts of power can be problematic in compact self-sufficient node packages.

BRIEF DESCRIPTION OF THE FIGURES

FIG. 1 is a block diagram of a wireless integrated network sensor (WINS) system or network configured to locate and track objects, under an embodiment.

FIG. 2 is a block diagram of an imaging node including a tracking system, referred to herein as an imaging and tracking node, under an embodiment.

Figure 3:
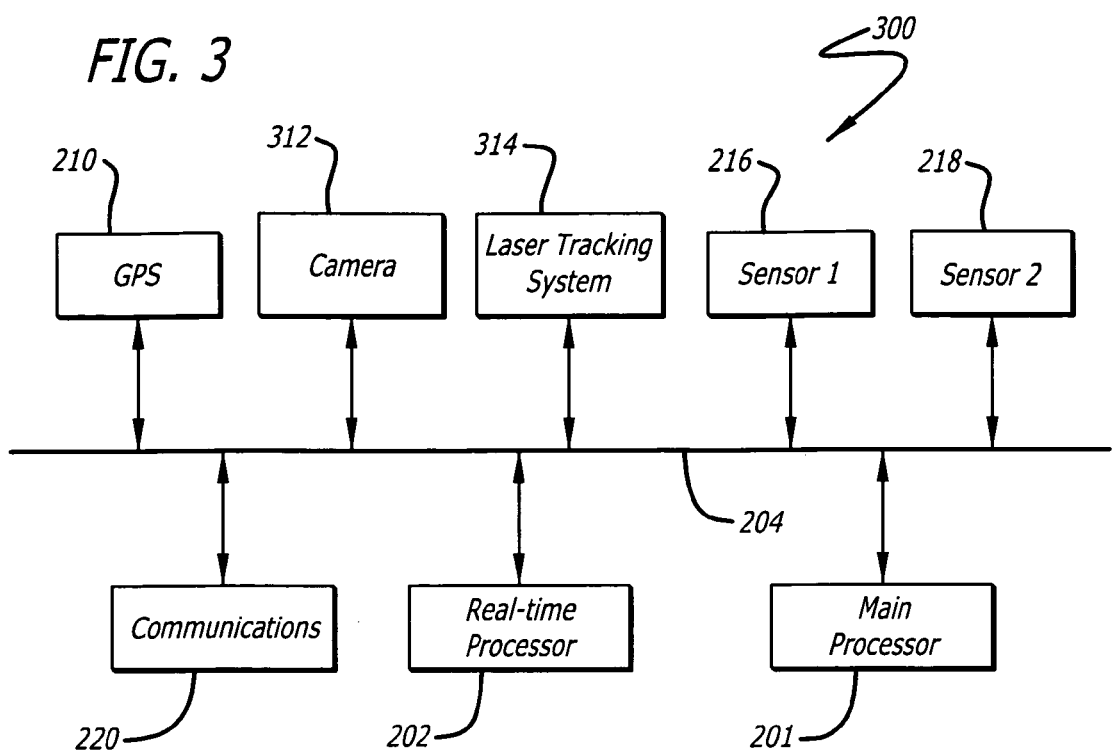
FIG. 3 is a block diagram of an imaging and tracking node, under an alternative embodiment of FIG. 2.

In the drawings, the same reference numbers identify identical or substantially similar elements or acts. To easily identify the discussion of any particular element or act, the most significant digit or digits in a reference number refer to the Figure number in which that element is first introduced (e.g., element 104 is first introduced and discussed with respect to FIG. 1).

The headings provided herein are for convenience only and do not necessarily affect the scope or meaning of the claimed invention.

DETAILED DESCRIPTION

A wireless integrated sensor network is described below that includes articulating tracking systems. In the following description, numerous specific details are included to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

The wireless integrated sensor network described herein combines the power and efficiency of passive sensors with the accuracy and selectivity of high-performance optical systems by integrating tracking systems like laser tracking systems, for example, with wireless integrated sensor networks equipped with visual or infrared imaging devices. Use of the tracking system allows components of the network to provide precise location, tracking, and targeting of objects moving through a sensor field or past a single integrated sensing and targeting unit. Further embodiments support arrays of sensors together with local signal processing in order to trigger cameras and laser tracking systems, or to provide an alternative location means for improved robustness. The wireless integrated sensor network of an embodiment is remotely controllable and configurable, with communication links enabling remote operators to receive information from the network via queries for sensory and image data, and re-task the system.

The sensor node technology described in the Related Applications referenced above combines functions including signal processing, sensing, and radio communications together in one package. The nodes are capable of self-configuration, that is, the organization and maintenance of their own network. Gateways provide connections to the outside world. Such systems enable monitoring of and control of the physical world through sensors and actuators. Their reach and use are greatly expanded through the use of technology that enables their control and monitoring using standard web browsing tools. Using this WINS web server technology, parameters of the remote nodes can be updated and new software and/or data loaded as it becomes available. Standard web protocols are used to enable secure communications sessions. Thus, the WINS nodes can manage communications to outside entities providing low installation cost, and allowing remote upgrades of software.

In security applications, there is a need for systems that can locate and track in real-time objects that have penetrated a security perimeter. FIG. 1 is a block diagram of a wireless integrated network sensor (WINS) system or network 100 configured to locate and track objects, under an embodiment. The network 100 of an embodiment includes a variety of nodes 102-106, including gateway nodes 102, imaging nodes 104, and sensor nodes 106. The nodes 102-106 function to couple an environment 199 to a remote command system 120, or remote system, via a communication network like a large-area network 110. In general, the nodes 102-106 accommodate any type of sensor input so that any physical input can be accommodated by the nodes 102-106, as described in the Related Applications.

The sensor nodes 106 include non-imaging sensors, like for example acoustic or thermal sensors, and may be used to relay communications, establish approximate target locations, and trigger activation of cameras. The sensor nodes 106 of an embodiment can also include tracking systems, but are not so limited.

The imaging nodes 104 use information propagated among components of the network 100 to focus on target regions and, once targets are detected or acquired, track the targets. The imaging nodes 104 provide imaging capability using cameras coupled to the sensor ports of the imaging node 104, but the embodiment is not so limited. The imaging nodes can also track the targets using a tracking system, for example a laser tracking system or a video tracking system where the tracking system includes articulating components. The imaging nodes 104 of various alternative embodiments include components of the sensor nodes 106, like the non-imaging or other passive sensors, to form hybrid sensor/imaging nodes.

The gateway nodes 102, often referred to as gateways 102, while communicating with various combinations and configurations of network components or elements like imaging nodes 104 and/or sensor nodes 106, establish links with wide- or large-area networks 110. The links between the gateway nodes 102 and the large-area network, for example, can be through a local command post or base station, and thence possibly to the Internet, but are not so limited. In this manner the gateway nodes 102 couple the components of the network 100, and hence information of the environment 199, to the large-area network 110. The gateway nodes 102 can also include any number and/or combination of sensor suites, imaging devices, and tracking devices; indeed, the local network 100 might comprise only a small number of the gateway nodes 102. The gateway nodes 102 of various alternative embodiments can include different combinations of components of the imaging nodes 104 and the sensor nodes 106 to form hybrid nodes.

A remote command system or remote system 120 collects and stores data from the nodes 102-106 of the deployed sensor network via the large-area network 110. The data is made available to users who can then query for particular information from the nodes 102-106 or command actions of the nodes 102-106, as described in the Related Applications.

The network 100 of an embodiment might include a single gateway 102 equipped with imaging and non-imaging sensors, or multiple gateway nodes 102 that support different views of the objects entering the field, or a mix of components that include tags that get attached to objects entering the area under surveillance.

Using the software architecture described in the Related Applications above, the nodes 102-106 can accept downloads of new or additional software, grant secure and prioritized access to sensing and communications devices, and access remote services. For example, each node 102-106 of an embodiment can include templates of identifying information of vehicles for use in processing collected data; the templates can include acoustic, thermal, and image data or information, for example. In cases where vehicle identification certainty is insufficient based on local node processing, the nodes 102-106 can access information of larger databases accessible via couplings with other nodes and/or the large-area network. Also, the decision may be made using more sophisticated algorithms and merging data from many sources; this can be accomplished by a combination of automatic processing and decisions by human operators.

The WINS node architecture supports integration of numerous types and/or combinations of components, including the imaging and tracking systems described above, as well as being incrementally and remotely upgradeable with software in support of the integrated components, as described in the Related Applications. FIG. 2 is a block diagram of an imaging node 104 including a tracking system, under an embodiment. The imaging node 104 includes, but is not limited to, at least one main processor 201 and a real-time processor 202 or set of real time processors coupled to one or more buses 204. In an embodiment, the real-time processor 202 mediates the buses 204 to control real-time processes, including sensors, actuators, and communications components.

As an example of on-board processes, the imaging node 104 of an embodiment includes and/or couples to a Global Positioning System (GPS) 210, an imaging system/device 212, a tracking system/device 214, sensors 216 and 218, and communication components 220 such as radios. Additional components are added to the node 104 via couplings through the appropriate node mating ports with the buses 204, using the appropriate device drivers as described in the Related Applications. Higher level functions such as target identification, data and image compression, tracking, and network configuration can be hosted on the main processor 201, but are not so limited.

The processors 201 and 202, as described in this embodiment, couple among the buses 204 and the components 210-220 of the imaging and tracking node 104, under program control. Alternatively, various other components (not shown) of the network of which the imaging nodes 104 are components can also couple among and communicate with the processors 201 and 202 and the components 210-220 of the imaging nodes 104 to provide data of the environment from the imaging nodes 104 to a remote operator.

While one main processor 201, one real-time processor 202, one bus 204, two sensors 216 and 218, and one each of the GPS 210, imaging system 212, tracking system 214, and communications system 220 are shown, various alternative embodiments include any number and/or type of each of these components coupled in various configurations or combinations contemplated by one skilled in the art. Further, while the components 201-220 of the imaging node 104 are shown as separate blocks, some or all of these blocks can be monolithically integrated onto a single chip, distributed among a number of chips or components of a host system or network, and/or provided by some combination of algorithms. The algorithms of the node components 210-220 can be implemented in software algorithm(s), firmware, hardware, and any combination of software, firmware, and hardware. The term "processor" as generally used herein refers to any logic processing unit, such as one or more central processing units (CPUs), digital signal processors (DSPs), application-specific integrated circuits (ASIC), etc.

FIG. 3 is a block diagram of an imaging node 300, under an alternative embodiment of FIG. 2. The imaging node 300 includes, but is not limited to, a main processor 201 and a real-time processor 202 or set of real time processors coupled to one or more buses 204. In an embodiment, the real-time processor 202 mediates the buses 204 to control real-time processes of components coupled to the buses 204. As an example, the node 300 of an embodiment includes Global Positioning System (GPS) 210, an imaging system/device in the form of a camera 312, a tracking system/device in the form of a laser tracking system 314, sensors 216 and 218, and communication components 220. These components are added to the imaging node 300 using couplings through the appropriate node mating ports to the buses 204, with appropriate device drivers.

The camera system 312 of an embodiment includes any combination of visual and thermal or infrared imaging elements. The camera system 312 can share servo mechanisms (not shown) with the laser tracking system 314 to enable two degrees of rotational freedom or, alternatively, employ a less finely calibrated set of motors. The imaging devices of the camera system 312 can include various zoom capabilities, but are not so limited. Acoustic sensors like directional microphones or microphone arrays can likewise share any servo mechanisms of the imaging node 300 in support of the gathering of directional acoustic information, as can any number/type of antenna systems.

The imaging node of an embodiment can be constructed using a variety of form factors. One embodiment can include a camera, sensor, laser designator, and antenna assembly mounted on a telescoping appendage to provide improved line of sight and elevation, but which may be lowered for unobtrusiveness or protection from harsh environmental conditions. In another embodiment, the imager is coupled to the host node/platform via wiring and be mounted on a fixed facility (e.g., a building, a post, a tree).

Articulating tracking imaging systems improve the deployability of the networks of which they are a component because, when camera orientation is fixed, precise deployment of the network is required to ensure overlapping fields of view. Ability to both change orientation and zoom enables far more freedom in node deployment, making possible alternatives to hand emplacement. Further, attention can be focused upon interesting events in the field of view, permitting a smaller number of network elements to be deployed. Likewise, articulation enables directional antennas to be employed, enabling extended range communication at low power, without the need for manual alignment of the antennas. In this way, images can be conveyed over longer distances than would be possible with fixed omnidirectional elements. Such features are large advantages in situations such as military operations in which rapid, autonomous deployment of sensing systems will free personnel from risk and undue use of their time and attention. Given that the WINS technology also provides for autonomous establishment of the sensor network and for remote re-tasking, the result is that the complete tracking imaging system can be conveniently established.

Regarding tracking systems of the imaging node 300, the use of a laser tracking system 314 provides a tight beam and a long technological history, enabling reliable tracking of particular targets even in the presence of many targets. However, as noted above, this may be supplemented with or replaced by other tracking devices such as tags, acoustic or seismic beam forming, and/or proximity detection in dense sensor fields to deal with loss of line of sight due to weather or physical obstructions. These other tracking devices can assist with acquisition and reacquisition of targets or enable a lower level of tracking accuracy that may suffice in certain instances. Moreover integration of the optical systems with other components can increase the number of events that can automatically be identified, reducing the frequency of human operator interactions and the bandwidth required for communications with remote networks.

Images, whether alone or in combination with acoustic signals, are particularly effective means for human operators to identify particular objects in that natural faculties are engaged. Image or acoustic processing software together with software for analysis of other sensory outputs as is known in the art may be used in the triggering decision or to assist the human operator in the identification. However, such software is rarely definitive as to making decisions for actions. Thus, any of the nodes 102-106 of an embodiment, with reference to FIG. 1, can host software that fuses information from different sensor types like imaging and non-imaging sensors, so that vehicle types of interest can automatically be made subjects of the node tracking system.

Tracking by the network as a whole can be enhanced by fusing information from multiple sensors, including cameras, and forwarding information on targets being tracked to nearby nodes. In this way, nodes go to higher levels of alertness to resume tracking of targets that may temporarily have been occluded by obstructions. With the use of fusing, the role of the remote operator becomes that of determining which vehicles are the subject of targeting or surveillance by other network assets. This decision can be assisted, for example, by confidence levels from signal processing algorithms operating on the seismic, magnetic, or acoustic sensor array outputs, or can be made purely from the images or acoustic streams.

Figure 4:
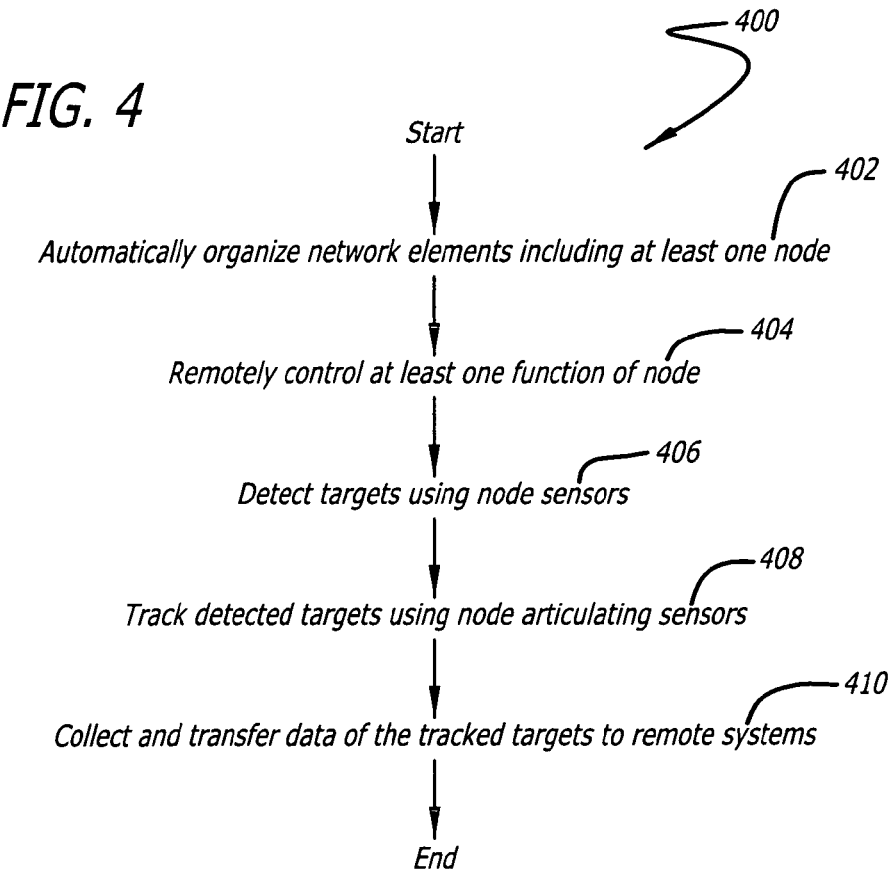
FIG. 4 is a flow diagram of a method for collecting data, under the embodiment of FIG. 1.

FIG. 4 is a flow diagram 400 for collecting data using imaging nodes, under the embodiment of FIG. 1. The nodes of an embodiment are self-organizing in that they automatically organize among the elements of the network of which they are a member, at block 402. The organizing includes coupling and configuring the nodes for information gathering and transfer among other nodes of the network and at least one remote system, as described in the Related Applications. In an embodiment, the nodes are coupled to the remote system via a communication network like a large-area network, but are not so limited. The nodes are remotely controlled via the remote system, at block 404.

Component systems of the nodes include at least one of location systems, communication systems, numerous types of sensors, and articulating sensors like imaging systems and tracking systems. These component systems use the on-board sensors along with couplings to information of neighboring nodes to detect targets in the environment local to the node, at block 406. The articulating sensors use the on-board sensor information to track the detected targets, at block 408. The articulating sensors include tracking systems like laser tracking systems, but are not so limited. The information gathered by the sensors and the articulating sensors is transferred to the remote system, at block 410, via a combination of other network nodes and components of the large-area network.

As an operational example, consider the scenario in which a single vehicle enters a secure perimeter or environment. Sensor nodes detect the vehicle's presence using acoustic or thermal sensors, for example, and possibly provide a preliminary indication of the vehicle type. The sensor nodes can also cooperate to determine the approximate vehicle position. Two imaging nodes or sensor nodes with imaging systems are controlled to take pictures. A remote operator is alerted, who then selects the target of interest in the browser image. The laser tracking system thereafter tracks the selected target while it remains within a line of sight of the imaging nodes.

In another example scenario, multiple vehicles enter the perimeter under surveillance. The remote operator selects particular vehicles for tracking (for example, the first and last vehicles of a convoy), and the imaging nodes begin tracking of the selected vehicles using the information of the selected vehicle. The remote system can further link the tracking information of the imaging nodes to weapon or other targeting systems in a situation where further ingress of the area by the vehicles is to be prevented.

Alternatively, tracking can be accomplished without the assistance of a laser tracking system or designator by using recognition software operating on the image data. The recognition software can be hosted on any nodes or components of the network or alternatively, distributed among the nodes and components of the network. In this embodiment, the camera moves to keep the target vehicle or person within the field of view. Tracking can be assisted by the use of other sensors, either resident on the node with the camera or elsewhere in the network.

Examples of security applications using the WINS systems described herein include establishment of perimeters around factories, airports and other public facilities, military forces, and securing of borders. Such systems can also include face or speech recognition software along with the targeting to improve recognition probabilities.

While object location, identification, and tracking has been described largely in the context of sensor networks, it will be apparent to those skilled in the art that the architecture described above will be of use in a wide variety of other human-machine interface applications. These applications include, but are not limited to, notebook computers, personal digital assistants, personal computers, security posts, and situations in which computing devices and/or peripherals are upgraded over time.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read-only memory (EEPROM)), embedded microprocessors, firmware, software, etc. If aspects of the invention are embodied as software, the software may be carried by any computer readable medium, such as magnetically- or optically-readable disks (fixed or floppy), modulated on a carrier signal or otherwise transmitted, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like * complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing and sensor systems, not only for the processing and sensor systems described above.

The elements and acts of the various embodiments described above can be combined to provide further embodiments. All of the above references and U.S. patents and patent applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims should not be construed to limit the invention to the specific embodiments disclosed in the specification and the claims, but should be construed to include all systems that operate under the claims. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What we claim is:

1. A method of collecting data in a sensor network, comprising:
   automatically organizing a plurality of network elements including a plurality of nodes locally disposed among an environment and at least one remote client system, wherein the organizing includes automatically coupling and configuring the plurality of nodes for self-assembly and further includes coupling and controlling a flow of information among the network elements, and wherein at least one of the plurality of nodes includes an articulating sensor;
   remotely controlling at least one function of the plurality of nodes;

detecting a target in the environment using at least one sensor of the plurality of nodes in addition to the articulating sensor;

tracking the target using the articulating sensor; and collecting and transferring data associated with the target to the remote client system.

2. The method of claim 1, further comprising manipulating the collected data, wherein manipulating includes at least one of routing, fusing, processing, evaluating, and storing the collected data.

3. The method of claim 2, wherein the plurality of nodes comprises a first node, and wherein fusing comprises the first node collecting and processing data from at least another of the plurality of nodes.

4. The method of claim 1, wherein the sensor is an acoustic sensor.

5. The method of claim 1, wherein the articulating sensor is at least one of a tracking system, an antenna, and an active sensor.

6. The method of claim 5, wherein the tracking system is at least one of a laser tracking system, an optical tracking system, and an imaging system.

7. The method of claim 6, wherein the optical tracking system is a camera system.

8. The method of claim 1, further comprising:

collecting optical data of the target using at least one optical sensor of the plurality of nodes; and identifying and designating the target using the optical data.

9. The method of claim 1, wherein the at least one sensor and the articulating sensor are on different nodes of the plurality of nodes.

10. The method of claim 1, wherein the plurality of network elements includes at least one gateway, at least one server, and components of at least one communication network.

11. A sensor network comprising a plurality of nodes, wherein the plurality of nodes are coupled to communicate with at least one remote system via at least one coupling with components of a wide area network, wherein the nodes automatically organize to form the sensor network in response to information communicated among the nodes, wherein the automatic organizing comprises automatically coupling and configuring the nodes to form the sensor network and automatically controlling data transfer, processing, and storage within the sensor network, wherein functions of the nodes are remotely controllable and programmable via internetworking among the nodes.

12. The sensor network of claim 11, wherein at least one of the nodes includes an articulating sensor, and wherein the articulating sensor is at least one of a tracking system, an imaging system, and an antenna.

13. The sensor network of claim 11, wherein the plurality of nodes include two or more node types, wherein a first node type includes at least one passive sensor and a second node type includes an articulating sensor.

14. The sensor network of claim 11, wherein at least one of the plurality of nodes is a gateway that communicates with the components of the wide area network.

15. A sensor node comprising:

at least one processor coupled to at least one communication device, wherein the at least one processor automatically couples the sensor node to and configures the sensor node among a plurality of network elements and automatically controls communication with and control of a flow of information among the network elements, wherein the network elements couple among an environment and at least one remote client system to support remote controllability of the sensor node via the remote client system; and at least one articulating sensor coupled to the at least one processor to track detected targets.

16. The node of claim 15, further comprising at least one sensor coupled to the processor to detect at least one target.

17. The node of claim 15, further comprising a photographic system.

18. The node of claim 15, wherein the articulating sensor is at least one of tracking system, a laser tracking system, and an optical tracking system.

19. The node of claim 15, wherein the plurality of network elements includes at least one gateway, at least one server, and components of at least one wide area network.

* * * * *